May 7, 1957 E. DEW 2,791,379
THERMOSTATICALLY CONTROLLED MIXING VALVE
Filed Jan. 3, 1956
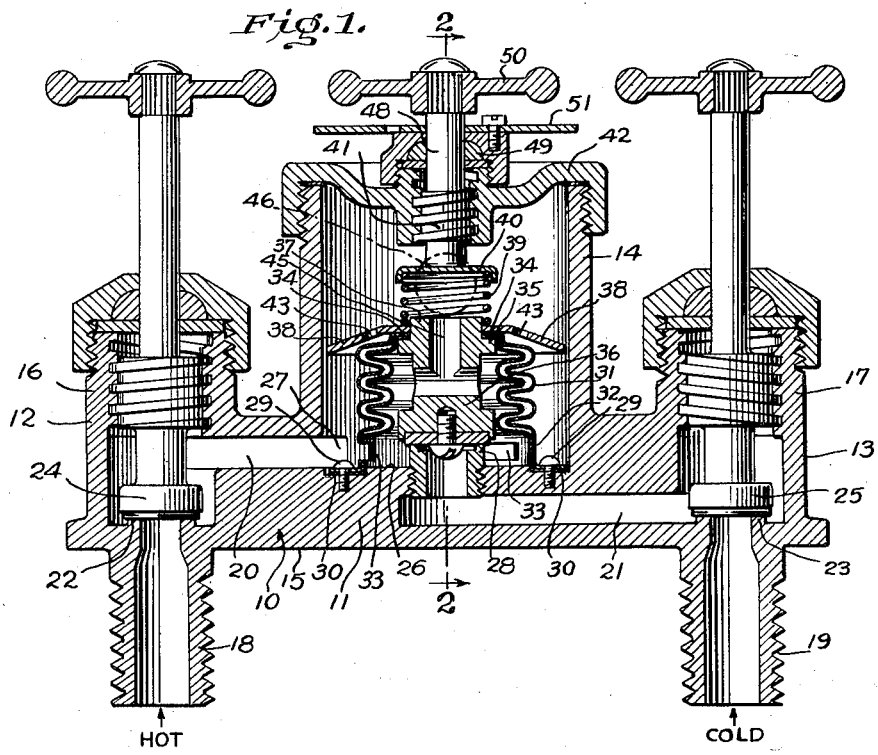
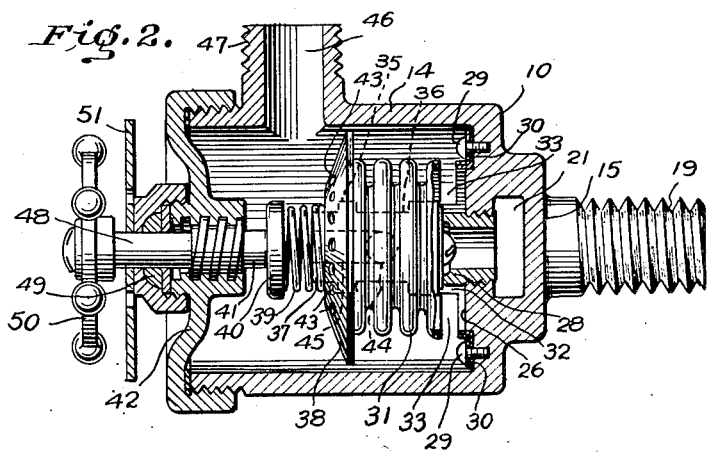
INVENTOR.
Evelyn Dew
BY
Reginald W. Hoagland
ATTORNEY

United States Patent Office 2,791,379
Patented May 7, 1957

2,791,379

THERMOSTATICALLY CONTROLLED MIXING VALVE

Evelyn Dew, Flint, Mich.

Application January 3, 1956, Serial No. 557,003

11 Claims. (Cl. 236—12)

This invention relates to thermostatically controlled mixing valves, and more particularly, to valves that maintain a predetermined temperature of mixed hot and cold water independent of temperature and pressure changes in hot and cold water supplied to the valve.

An object of the invention is to provide a novel and improved hot and cold water mixing valve wherein hot water is permitted to freely enter a mixing chamber of the valve through a manually regulated control, and cold water is permitted to enter said chamber only in accordance with the temperature of the water in the chamber.

Another object of the invention is to provide, in a mixing valve of the above character, a manually regulated control for shutting off the supply of cold water.

A further object of the invention is to provide, in a mixing valve as set forth, a novel manually adjustable means whereby the temperature of mixed hot and cold water may be regulated, and when set, thermostatic means will control the inlet of cold water to maintain a constant temperature of the mixture.

It is also an object of the invention to provide a thermostatically controlled mixing valve in accordance with the preceding objects which is extremely simple and substantial in construction, inexpensive to manufacture, and yet highly efficient and practical in use.

These, together with various auxiliary features and objects of the invention which will later become apparent as the following description proceeds, are attained by the present invention, a preferred embodiment of which has been illustrated by way of example only in the accompanying drawings, wherein:

Figure 1 is a longitudinal sectional view through the valve constructed in accordance with the invention; and Figure 2 is a cross sectional view with parts in elevation and taken substantially on line 2—2 of Figure 1.

Referring now more specifically to the accompanying drawings wherein like numerals designate similar parts in both views, the numeral 10 indicates generally a main body member or casing having a horizontally arranged elongated portion 11, a pair of cross heads 12 and 13 on opposite ends of the elongated portion, and an enlarged barrel-like cylinder 14 also on and to one side of said elongated portion and midway between and parallel with the cross heads. Longitudinally of the elongated portion 11 and on the side thereof opposite to that from which the central cylinder 14 projects is an abutment face 15 for engagement with a flat wall surface (not shown) when the device is installed and in use. The cross heads 12 and 13 extend to both sides of the elongated portion 11 and are constructed to include casings 16 and 17, respectively, for hand-operated valves and threaded nipples 18 and 19, respectively, that project from the abutment face 15 for extending through the wall and for attachment to water supply pipes (not shown). The threaded nipple 18 of the cross head 12 is for connection to a hot water supply pipe, while the nipple 19 of the head 13 is to be connected to the cold water supply pipe, as designated in Figure 1 of the drawings.

The openings through the nipples 18 and 19 communicate with the outer ends of a pair of longitudinally extending passageways 20 and 21, respectively, in the elongated portion 11, and at the locations of communication, there are provided valve seats 22 and 23, respectively, which cooperate with manually adjustable hand valves 24 and 25 threaded in the valve casings 16 and 17 for controlling the flow of hot and cold water to the passageways 20 and 21. As shown in Figure 1, the passageways 20 and 21 are arranged on different planes, and while the hot water passageway 20 opens into the cylinder 14 through its cylindrical wall and adjacent a bottom or end wall 26 thereof, as indicated by the numeral 27, the cold water passageway 21 communicates with said cylinder through a removable valve seat 28 threaded in and located at the center of the end wall 26.

Recessed in and fixed by screws 29 to the bottom or end wall 26 of the cylinder 14 is an outwardly directed annular flange 30 on one end of a double-walled tubular thermostat 31 that is concentrically arranged around the valve seat 28. Between the flange 30 and the formation of bellows convolutions of the double-walled thermostat, the two walls of the thermostat are sealed together and form a short, non-active cylindrical extension 32 through which relatively large openings 33 are provided for freely communicating the interior of the tubular thermostat with the interior of the cylinder 14. The space between the convoluted portions of the inner and outer walls of the double-walled thermostat is sealed and filled with an expansible liquid or vapor to cause endwise expansion and contraction of the thermostat with changes of temperature.

There is formed on the opposite or free end of the tubular thermostat 31 an inwardly directed annular flange 34 which is engaged on its inner side by a shoulder 35 on a removable valve member 36 positioned within and carried by the thermostat for movement toward and away from the valve seat 28 according to the temperature of water in the cylindrical chamber 14. An extension 37 on the movable valve member 36 projects through the thermostat flange 34 and also through a central opening in a diffusion disc-like plate 38 before being embraced by an end of a spiral compression spring 39 that bears on said diffusion plate. A spring cap 40 engages over the other end of the spring 39 and in turn is engaged by a manually adjustable member 41 carried by a bonnet 42 attached to and closing the open end of the cylinder 14. It can be seen that adjustment of the member 41 varies the tension of spring pressure on the end of the thermostat and thus changes the amount of opening between the movable valve member 36 and valve seat 28 at different temperatures.

The diffusion disc-like plate 38 is slightly frusto-conical in shape and of a diameter slightly less than the inner diameter of the cylinder 14, which positions the periphery of the plate in close proximity to the inner cylindrical surface of the cylinder 14 and nearer to the end wall 26 than the central portion of said plate. There is a plurality of small water passage holes 43 through the diffusion plate 38 which aid in thoroughly mixing the hot and cold water. To further increase circulation through the tubular thermostat 31, there is a transverse bore 44 through the movable valve member 36 which is intersected by a longitudinal bore 45 extending outwardly through the extension 37 of said movable valve member. An opening 46 through a threaded nipple 47 on the cylinder 14 provides an outlet for tempered water in the mixing chamber. In Figure 2, it will be observed that independent of the expansion of the thermostat 31, the diffusion disc-like plate 38 is at all times positioned between the tempered water outlet 46 and the hot and cold water inlets 27 and 28.

The bonnet 42 is threaded upon the open end of the cylinder 14 and has a stem 48 of the manual adjustment member 41 threaded in and projecting therethrough. Threaded on the bonnet 42 and positioned about the stem 48 is a gland nut of a packing assembly indicated generally at 49. A hand wheel 40 is secured to the outer end of the stem 48 in the usual detachable manner and has a pointer (not shown) thereon which registers with indicia on a dial plate 51 attached to the gland nut of the packing assembly 49 for indicating the adjusted position as to water temperature of the manual adjustment member.

With this construction, it will be observed that upon manually opening both the hot and cold water supply valves 24 and 25, hot water flows through the passageway 20 and immediately enters the mixing chamber, and that cold water in the passageway 21 is prevented from entering said mixing chamber by the movable valve member 36 until the temperature of hot water supplied to the mixing chamber approaches that to which the adjustment member 41 has been set. When the temperature of water in the mixing chamber reaches the temperature set by the member 41, the thermostat expands and moves the valve member 36 away from the valve seat 28 to allow cold water to enter the mixing chamber and be mixed with the hot water. As the temperature of water in the mixing chamber changes due to variations of the temperature of either the hot or cold water supply, the thermostatically operated valve automatically controls the inlet of cold water in direct proportion to the temperature of water in the mixing chamber for maintaining a constant temperature of tempered water. To regulate the flow of tempered water from the mixing chamber, it requires only an adjustment of the hand-operated valve 24 in the hot water supply line to the chamber, as the supply of cold water to the mixing chamber is solely and automatically controlled by the temperature of water in the chamber. It is, however, essential to provide the shut-off valve 25 for the supply of cold water, as there would be no means of preventing dripping of water from the mixing chamber in case of a slight leakage through the thermostatically controlled valve. Also, when making inspection or repairs to the working parts of the automatic control, it is essential that the cold water supply be closed.

A normal change in pressure in either of the hot or cold water supply will in no way affect a change in the temperature of water passing through the outlet from the mixing chamber, as the thermostatically controlled valve will automatically care for pressure changes as well as temperature changes in supply lines.

In view of the above description, taken in conjunction with the accompanying drawings, it is believed that a clear understanding of the construction, operation, and advantages of the improved valve will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

1. A thermostatically controlled mixing valve comprising a casing having therein a cylindrical mixing chamber with an open end and a closed end, a hot water passageway leading to and communicating with said mixing chamber adjacent its closed end, a cold water passageway also leading to and communicating with said chamber but at a location centrally of said closed end, and a tempered water outlet opening communicating with said chamber adjacent its open end; a bonnet attached to said casing and closing the open end of said chamber; a manually operated valve built into said casing for controlling the flow of water through said hot water passageway; a valve seat at the location of communication of said cold water passageway with said chamber; a tubular thermostat concentrically arranged in said cylindrical chamber and having the interior thereof freely communicating with the interior of said chamber, said tubular thermostat being fixed at one of its annular ends to the closed end of said chamber outwardly of and concentric to said valve seat; and a movable valve member within said tubular thermostat and carried by the free end thereof and moved by contraction and expansion of said thermostat toward and away from said valve seat to regulate the flow of cold water into the mixing chamber.

2. A thermostatically controlled mixing valve comprising a casing having a cylindrical mixing chamber, a hot water passageway leading to and communicating with said mixing chamber adjacent one of its ends, a cold water passageway also leading to and communicating with said chamber at the same end as that of said hot water passageway but at a location centrally of said end, and a tempered water outlet opening communicating with said chamber adjacent its opposite end; a manually operated valve for controlling the flow of water through said hot water passageway, a valve seat at the location of communication of said cold water passageway with said chamber, a tubular thermostat concentrically arranged in said cylindrical chamber and having the interior thereof freely communicating with the interior of said chamber, said tubular thermostat being fixed at one of its annular ends to the end of said chamber having the valve seat and arranged outwardly of and concentric to said valve seat; and a movable valve member within said tubular thermostat and carried by the free end thereof and moved by contraction and expansion of said thermostat toward and away from said valve seat to regulate the flow of cold water into the mixing chamber.

3. A thermostatically controlled mixing valve as defined in claim 2, wherein a diffusion plate of slightly less diameter than the cylindrical chamber is also carried by the free end of the thermostat and, independent of the expansion of said thermostat, is positioned between the water inlets and outlet to said chamber.

4. A thermostatically controlled mixing valve as defined in claim 2, wherein there is provided yieldable means that retard the expansion of the thermostat, and a manual adjustment for varying the tension of said yieldable means so as to change the degree of opening between the movable valve member and valve seat at different temperatures.

5. A thermostatically controlled mixing valve as defined in claim 1, wherein there is provided a hand-operated adjustment member threaded in and projecting through said bonnet and centrally aligned with said thermostat; and a spiral compression spring between said adjustment member and the free end of said thermostat so as to apply adjustable pressure on said thermostat.

6. A thermosatically controlled mixing valve comprising a casing having therein a cylindrical mixing chamber with an open end and a closed end, a hot water passageway leading to and communicating with said mixing chamber adjacent its closed end, a cold water passageway also leading to and communicating with said chamber but at a location centrally of said closed end, and a tempered water outlet opening communicating with said chamber adjacent its open end; a bonnet attached to said casing and closing the open end of said chamber; a manually operated valve for controlling the flow of water through said hot water passageway; a valve seat at the location of communication of said cold water passageway with said chamber; a tubular double-walled thermostat in said chamber and having a non-active annular extension on one of its ends that is fixed to the closed end of said chamber outwardly of and concentric to said valve seat; said tubular themostat also having a plurality of openings through the non-active annular extension thereof; and a movable valve member within said tubular thermostat and carried by the free end thereof and moved by contraction and expansion of said thermostat toward and away from said valve seat to regulate the flow of cold water into the mixing chamber.

7. A thermostatically controlled mixing valve as defined in claim 6, wherein said movable valve member projects through the free end of the tubular thermostat and has at least one opening therethrough that communicates the interior of the thermostat with the interior of the mixing chamber.

8. A thermostatically controlled mixing valve as defined in claim 6, wherein a perforated diffusion plate of slightly less diameter than the cylindrical chamber is also carried by the free end of the thermostat and at all times is positioned between the water inlets and outlet to said chamber.

9. A thermostatically controlled mixing valve comprising a casing having therein a cylindrical mixing chamber with an open end and a closed end, a hot water passageway leading to and communicating with said mixing chamber adjacent its closed end, a cold water passageway also leading to and communicating with said chamber but at a location centrally of said closed end, and a tempered water outlet opening communicating with said chamber adjacent its open end; a bonnet attached to said casing and closing the open end of said chamber; a manually operated valve built into said casing for controlling the flow of water through said hot water passageway; a valve seat at the location of communication of said cold water passageway with said chamber; a tubular double-walled thermostat concentrically arranged in said cylindrical chamber and having the interior thereof freely communicating with the interior of said chamber; inwardly and outwardly directed flanges on the opposite ends of said tubular thermostat; means fixing the outwardly directed flange to the closed end of said chamber and concentrically around said valve seat; a movable valve member within and projecting through said tubular thermostat and having a shoulder thereon engaging the inner face of said inwardly directed flange; a diffusion plate engaging the outer face of said inwardly directed flange and having a central opening therein through which the projecting portion of said movable valve member extends; said plate having its periphery in close proximity to the cylindrical wall of said chamber; a spiral compression spring with one end thereof engaging said diffusion plate and positioned about the projecting portion of said movable valve member; a spring cap on the opposite end of said spring; and a hand-operated adjustment member threaded in and projecting through said bonnet and in engagement with said spring cap.

10. A thermostatically controlled mixing valve as defined in claim 9, wherein the movable valve member has communicating transverse and longitudinal openings therein that comunicate the interior of the thermostat with the interior of the chamber.

11. A thermostatically controlled mixing valve as defined in claim 9, wherein the diffusion plate is slightly frusto-conical shaped and has a plurality of small apertures therethrough.

References Cited in the file of this patent

UNITED STATES PATENTS

| | | |
|---|---|---|
| 1,455,934 | Powers et al. | May 22, 1923 |
| 1,801,094 | Lawler | Apr. 14, 1931 |
| 1,985,929 | Jorgensen et al. | Jan. 1, 1935 |
| 2,199,129 | Hamilton | Apr. 30, 1940 |
| 2,484,180 | McConnell | Oct. 11, 1949 |

FOREIGN PATENTS

| | | |
|---|---|---|
| 350,620 | Germany | Jan. 22, 1921 |